United States Patent [19]
Petri

[11] Patent Number: 5,584,625
[45] Date of Patent: Dec. 17, 1996

[54] BOLT WITH SHEARABLE HEAD

[76] Inventor: Manfred Petri, Eichendorffstrasse 19 95032, Hof/Saale, Germany

[21] Appl. No.: 435,492

[22] Filed: May 5, 1995

[30] Foreign Application Priority Data

May 15, 1994 [EP] European Pat. Off. .............. 94107522

[51] Int. Cl.$^6$ ............................ F16B 31/00; F16B 35/00
[52] U.S. Cl. ................ 411/5; 411/178; 411/384; 411/393
[58] Field of Search ................ 411/2, 3, 5, 178, 411/383, 384, 393

[56]  References Cited

U.S. PATENT DOCUMENTS

| 866,184 | 9/1907 | Brison | 411/393 |
|---|---|---|---|
| 869,086 | 10/1907 | Hoffman | 411/393 |
| 4,082,130 | 4/1978 | Rech | 411/5 |
| 4,225,165 | 9/1980 | Kesselman | 411/5 X |
| 4,874,275 | 10/1989 | Gotman | |

FOREIGN PATENT DOCUMENTS

470388A3  2/1992  European Pat. Off. .

*Primary Examiner*—Neill R. Wilson
*Attorney, Agent, or Firm*—Majestic, Parsons, Siebert & Hsue

[57]  ABSTRACT

The present invention is directed to a bolt with shearable head (1) with an external thread section (15), a head section (3) and a taper section (7) forming a predetermined breakage point (6), provided for between the external thread section and the head section, as well as an end section providing a clamping contact (9). Furthermore, there is provided a threaded bush (15), extending at least partly along the external thread section (5) and having in turn an external thread (17).

20 Claims, 2 Drawing Sheets

BOLT WITH SHEARABLE HEAD

BACKGROUND OF THE INVENTION

The present invention relates to a bolt with shearable head according to the generic term of claim 1.

Today bolts with shearable head are used e.g. in screw connections or screwed cable lugs for clamping cables or wires.

From EP-A-0 470 388 a bolt with shearable head is prior art, having an external thread section, a head section, a taper section with a predetermined breaking point, arranged in between the external thread section and the head section, as well an end section providing a clamping contact.

The external thread section is here screwed into a corresponding internal thread section of a screw connection or screwed cable lug, into which a conductor has been inserted, which shall be clamped by the bolt with shearable head.

In order to guarantee a defined tightening moment in agreement with the relevant provisions, the bolt with shearable head has a predetermined breaking area in form of a predetermined cross section, breaking away from the thread section at a predetermined torque applied to the head section.

By means of the bolt with shearable head of the above mentioned state of the art a satisfactory result for clamping the relevant conductor may be reached.

However, the individual conductors connected to the screw connectors or screwed cable lugs are of different sizes, depending on the relevant transmission power and/or strength of the conductor. This means that a variety of differnt screw connectors is required, in turn requiring bolts with shearable head of different dimensions. The variety of bolts with shearable head results in higher costs for each individual bolt and leads to problems concerning the application safety as the danger of confusion is increased.

SUMMARY OF THE INVENTION

Therefore the present invention is based on the task to reduce the above mentioned problem and to create a bolt with shearable head, applicable for different cross sections and/or strengths of the element to be clamped, in particular of the conductor to be clamped.

This task will be solved by the subject-matter of claim 1.

As provided for by this invention a threaded bush is provided, situated at least partly alongside with the external thread section and having in turn also an external thread.

As an advantage the proposed bolt with shearable head makes it possible to clamp conductors and/or components of different cross sections in general, even those of different strengths, in an adequate connection element with defined tightening moment, thus that the former variety of bolts with shearable head having different diameters may be reduced considerably.

A particularly good guidance of the end section is achieved by the fact that the threaded bush also extends around the radial external circumference of the end section. A particular advantage consists in the fact that this results in a reduction of the overall length of the bolt with shearable head, as the end section is mainly inside the threaded bush. Above all this is of advantage, if the difference between the inner boring of the connector and the outer diameter of the element to be clamped is too low, such that an extension of the e.g. spherical end section into the recess of the screw connector or screwed cable lug would obstruct the insertion of a larger element to be clamped.

To guarantee a safe screwing-in of the bolt with shearable head into the connecting element in case of a first preferred embodiment, a catching of the threaded bush is achieved by arranging it in pre-installed condition such that it is fixed or blocked in turning on the outer thread section. When screwing it in it is thus guaranteed, that the threaded bush turns together with the outer thread section of the inner bolt.

According to a preferred embodiment of the bolt with shearable head as provided for by this invention, the end section, sitting close to the element to be clamped, in particular to the electrical conductor, is designed in spherical form. As an alternative it may have a trapezoidal form. Furthermore it is also possible to give it the form of a needle, i.e. with a point, in particular for clamping large and/or extremely condensed conductors.

In an embodiment of the bolt with shearable head as provided for by this invention, it can however only be screwed in to a predetermined degree due to the design of the connecting element, then the threaded bush will be locked due to the cross section of the inner recess of the connecting element which again tapers. By further turning in the inner bolt the clamping section may be further screwed into the connector and/or the connecting element and thus even conductors having far smaller cross sections will be clamped.

In another preferred embodiment the threaded bush includes a limit stop device arranged at the end section looking towards the head section.

As an advantage the limit stop is designed in form of a cap-like shoulder, projecting beyond the outer circumference of the outer threading of the thread bush. The cap-like projecting part might extend along the overall circumference of the thread bush or it may be interrupted. In another embodiment example the limit stop may be designed as a nose-like projecting part.

As an advantage the threaded bush includes an inner limit stop shoulder, offering a simple way to effect a turning blockage by an adequate tightening moment.

An inner recess is provided in the head section, in the taper section and in the external thread section to guarantee a safe and simple turning-in of the bolt. As an advantage it may be designed as hexagon socket, such that a screwing-in of the bolt with shearable head is possible by means of an adequately standardized Allan key and the adequate tightening moment may be transmitted by this tool, shearing off the head section if the tightening moment that can be absorbed by the bolt with shearable head is exceeded.

As an advantage the cross section of the inner recess in the outside thread section is smaller than that in the head section, thus guaranteeing that when using the correct Allan key, force will only be applied to the head section which may thus be torn off. Afterwards the bolt may be loosened again by means of the remaining hexagon socket.

In a simple preferred embodiment example the bolt with shearable head has only one threaded bush, having an axial extension essentially corresponding to the axial extension of the outer thread section.

In addition the wall thickness of the threaded bush may be changed in a certain range, such achieving different outer diameters of the overall bolt, such permitting an adaption to varied inner diameters of threaded boreholes in the relevant connectors or connecting elements.

In a second preferred embodiment example the threaded bush itself also includes a head section and a taper section, provided between threaded bush and head section.

Consequently this results in a "double bolt", having the advantage that on the one hand the outer bolt permits to create a high tightening moment for a large and/or hard conductor and smaller and/or softer conductors may be adequately clamped by the inner bolt.

In addition the bolt with shearable head is designed such that the head section of the threaded bush surrounds the head section connected to the outer section of the inner bolt with shearable head. Furthermore it provides an inner recess in the head section of the threaded bush, which may be designed as hexagon socket in another preferred embodiment example. This may serve to screw in the head section of the threaded bush into the corresponding threaded boring of a connector by means of an adequate Allan key.

Alternatively the head section has a hexagon outer form which may be grasped by adequate tools.

The cross section of the inner recess of the threaded bush's head section is preferably chosen larger than the cross section of the inner recess of the inner bolt, thus ensuring that only one of the two bolts can be tightened by the relevant tool. Due to its design as double bolt the hexagon socket of the inner bolt can also no longer be designed in a stepped version, however the advantages of the stepped version are being preserved. The unstepped design clearly represents a simplification with regard to manufacturing engineering aspects.

As an alternative the cross section of the inner recess of the threaded bush's head section may also be chosen smaller than the cross section of the inner recess of the inner bolt, preventing certainly that the inner bolt may be turned by a tool for the outer bolt.

As an advantage the threaded bush also includes a limit stop area acting in axial direction, which may take its bearing on the end section, limiting the turn of the threaded bush. This ensures an appropriate power transmission from the threaded bush to the end section for clamping large conductors.

In the maximum screwed-in condition of the inner bolt into the outer bolt the inner taper area is arranged such that it is situated in the field of the outer taper area, thus defining an appropriately defined shear-off surface.

As an advantage the outer thread section of the inner bolt and the outer thread of the threaded bush show different leads, the lead of the outer thread of the threaded bush being larger than the lead of the outer thread section of the inner bolt, thus correspondingly higher active forces may be transmitted to the element to be clamped. As a consequence a smaller lead results in a higher bolt pressure.

Furthermore the present invention also in general relates to a connecting element and in particular to a screw connection and/or a screwed cable lug, having a tube-like longitudinal connection housing with an opening on at least one of its front sides for receiving a longitudinal element, in particular an electrical conductor, to be connected in the connection housing; the side wall of the housing having at least one thread opening for receiving the clamping screw. As provided for by this invention this clamping screw is designed as a bolt with shearable head as provided for by this invention.

The connector's design as provided for by this invention and the use of the bolts with shearable head as provided for by this invention have the advantage that a far slimmer and far more space-saving design of the connector is achieved, resulting in a corresponding material saving.

The details, characteristics and advantages of the present invention result from the subsequent description with reference to the drawing.

DESCRIPTION OF THE PREFERRED EMBODIMENT

Figure 1:
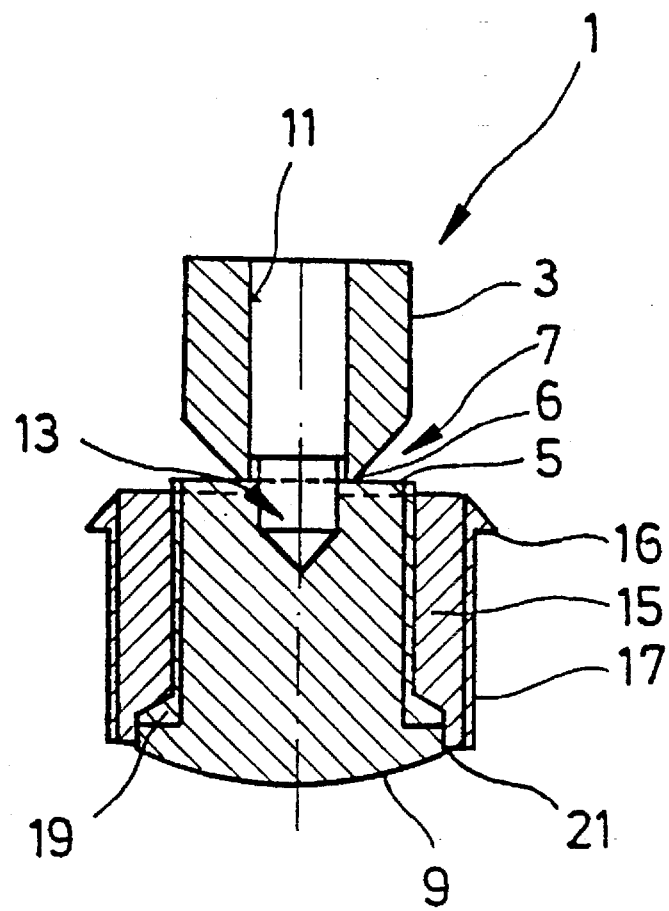
FIG. 1 shows the cross section of a first preferred embodiment example of the bolt with shearable head as provided for by this invention.

As shown in FIG. 1, a first embodiment example of a bolt with shearable head 1 as provided for by the proposal includes a head section 3, an outer thread section 5 and a taper section 7 forming a predetermined breaking point 6, arranged between the outer thread section 5 and the head section 3.

On the lower end of the bolt with shearable head 1 an end section 9 is arranged, providing a clamping contact.

An inner recess 11 is situated in head section 3, which may preferably be designed as hexagon socket. The inner recess 11 extends into the outer thread section 5, its cross section becoming smaller in the area 13, situated in the outer thread section 5. This prevents an appropriate tool from penetrating into the outer thread section area 5, thus it would be preventing that a shearing-off of head section 3 is prevented when the bolt with shearable head 1 is adequately tightened.

The bolt with shearable head 1 as provided for by this proposal also includes a threaded bush 15, having an internal thread fitting the external thread of the external thread section 5, as well as an external thread 17.

In axial direction the threaded bush 15 includes a limit shoulder 19, which may take axial bearing to end section 9, possibly leading to a jamming of the inner bolt with threaded bush 15, resulting in a blockage of the turning of external thread section 5 with regard to threaded bush 15.

In the lower section of threaded bush 15 depicted in FIG. 1, this also extends around the radial outer circumference 21 of end section 9, resulting in a correspondingly good guidance of the total bolt with shearable head, in particular when clamping large conductors. In addition a correspondingly smaller and slimmer design of the bolt with shearable head is achieved.

In preassembled condition the threaded bush 15 with outer thread section 5 is at least clamped as stable as to ensure that threaded bush 15 will be catched when screwing in a connector into an adequate threaded bore.

As the connectors or screw connections generally have a cylindrical outer diameter and a cylindrical bore for receiving the element to be connected, e.g. a conductor, the threaded bush 15 can only be screwed in up to half the diameter, as the corss section of the inner opening tapers again in screw-in direction, such that here a corresponding stop effect with regard to threaded bush 15 exists.

In case the object to be clamped has a smaller cross section, not extending up to half the diameter of the inner bore, the turning blockage of the outer thread section 5 together with end section 9 may be loosened by turning the inner screw further, the threaded bush 15 remaining fixed, now the outer thread section 5 together with head section 3 may be screwed in further, until it reaches the element to be clamped, e.g. the conductor. After that an adequate force will be exerted on the bolt with shearable head 1 by means of the tool inserted into the inner recess 11, until head section 3 will be sheared off due to the predetermined breaking point 6.

As can be seen in FIG. 1 the bolt with shearable head as provided for by this invention also includes a limit stop 16, designed as a cap-like shoulder, situated on the end section of threaded bush 15 looking towards the head section. When screwing in the bolt with shearable head 1 this limit stop takes bearing on the receiving bore, thus achieving a locking of the threaded bush when screwing the connecting element into the bore. After that the inner screw may be screwed further into the direction of the element to be clamped.

Figure 2:
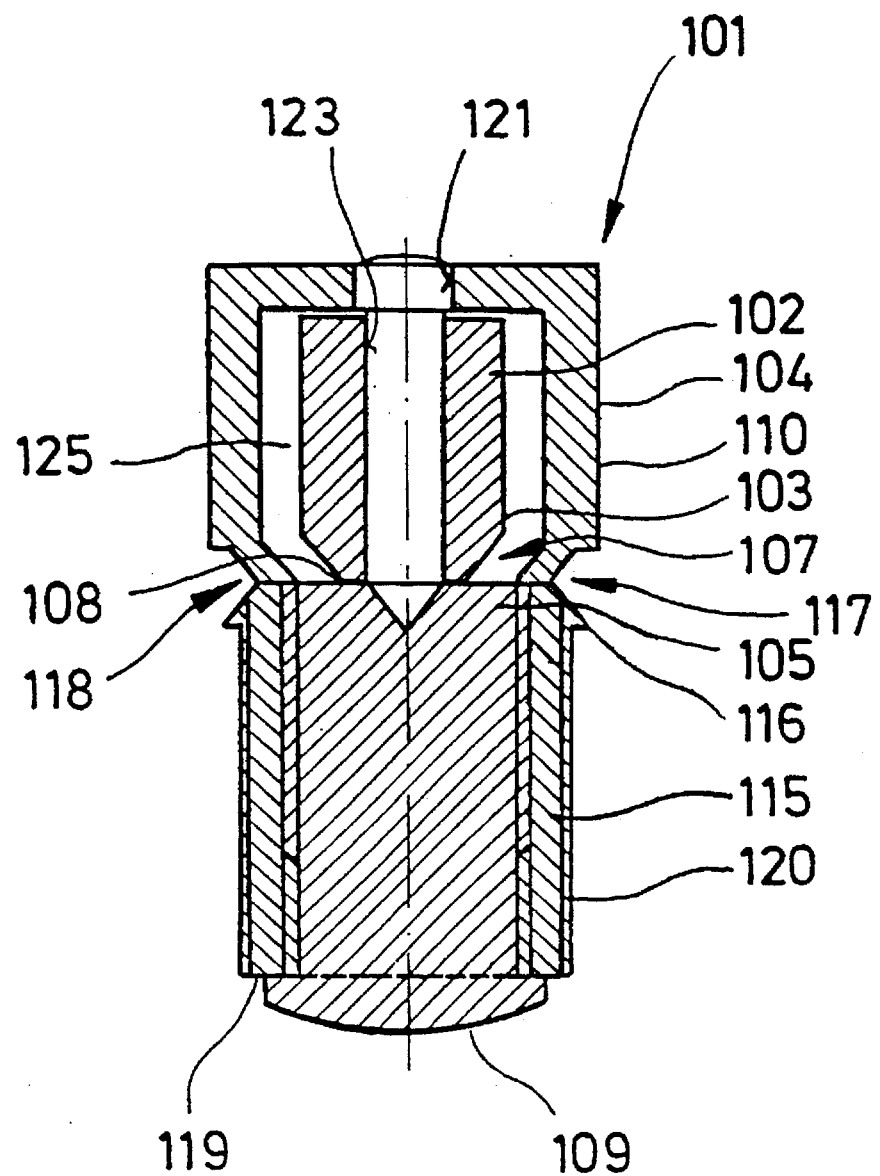
FIG. 2 shows the cross section of a second preferred embodiment example of the bolt with shearable head as provided for by this invention.

In FIG. 2 a second embodiment example of the bolt with shearable head as provided for by this invention is shown. The bolt with shearable head 101 includes an inner and outer bolt with shearable head 102 and/or 104.

The inner bolt with shearable head 102, of similar design as the bolt with shearable head 1 according to FIG. 1, includes a head section 103 and an outer thread section 105. On the lower end of the outer thread section 105 an end section 109 is provided permitting a clamping contact.

A taper section 107 together with a predetermined breaking point 108 is provided between head section 103 and outer thread section 105.

Around the outer thread section 105 a thread bush 115 extends in the thread contact area, which may take axial bearing on end section 109 with ist lower face side 119. FIG. 2 shows the bearing position. Threaded bush 115 includes an outer thread 120.

The threaded bush 115 is connected to head section 110, in between there is again a taper section 117 with a predetermined breaking point 118.

Head section 110 as well as head section 103 each include an inner recess 121 and/or 123, being e.g. also designed as hexagon socket.

As can be clearly seen in FIG. 2, the cross section of the inner recess 123 is distinctly smaller than the cross section of the inner recess 121, thus a tool suitable for the hexagon socket 121 cannot be inserted into the inner recess 123.

Of course it is also possible to grasp head section 110 of the outer bolt 104 from the outside with an adequate tool.

As an alternative the inner recess of the inner bolt 102 may also be larger than the inner recess of the outer bolt 104.

In the position of the bolt with shearable head 101 shown in FIG. 2 it may be screwed into an adequate connector, the outer bolt first being screwed in with a tool, inserted into the hexagon socket 121, i.e. an Allan key. If the bolt with shearable head 101 contacts the element to be clamped before the threaded bush 115 gets to the limit stop, it will be clamped adequately and the head section 110 will be sheared off if a certain tightening moment is exceeded.

Similar to the bolt with shearable head 1 according to FIG. 1, the bolt with shearable head 101 includes a limit stop 116, designed as cap-like shoulder.

In case the face side 119 stops at the relevant limit stop and/or the limit stop device 116 before end section 109 contacts the element to be clamped, e.g. an electrical conductor, at first the head section 110 of the outer bolt 104 is sheared off by further acting upon it. By screwing the inner bolt 102 further in, it will be turned further in the outer bolt 104, until the end section 109 takes bearing on the element to be clamped. Subsequently head section 106 of the inner bolt will be sheared off when exceeding the relevant tightening moment.

By means of the bolt with shearable head 101 as provided for by this invention, it is thus of particular advantage that by acting upon the outer bolt 104 with a high tightening moment, a large and/or hard element to be clamped may be clamped, whereas the inner bolt 102 serves to clamp small and/or soft clamping elements adequately.

The present invention is not limited to the above described embodiment examples. For example other designs of head sections 3 and/or 110 may be chosen, e.g. by a hexagon insert bit. In addition threaded bushs 15 and/or 115 of various thicknesses may be made to fit the most varied bores in the connectors.

The present invention thus creates a possibility to adapt bolts with shearable head to different cross sections and/or strengths of the elements to be clamped, in particular of electrical conductors, thus leading to a reduction in the number of different bolts with shearable head, resulting in adequate cost advantages.

I claim:

1. Bolt with shearable head with an external thread section, a head section and a taper section forming a predetermined breakage point, provided for between the external thread section and the head section, as well as an end section providing a clamping contact, wherein a threaded bush is provided, extending at least partly along the external thread section and having in turn an external thread and wherein a cross-section of the end section is larger than a cross-section of an inner thread of the threaded bush.

2. Bolt with shearable head according to claim 1, wherein the end section has a radial outer circumference, and the threaded bush also extends around the radial outer circumference of the end section.

3. Bolt with shearable head according to claim 1 or 2, wherein in the pre-assembled condition the threaded bush is arranged on the external thread section such that it is fixed or blocked in its turning movement.

4. Bolt with shearable head according to claim 1 or 2, wherein the threaded bush includes an inner limit stop shoulder.

5. Bolt with shearable head according to claim 1, wherein on the end section of the threaded bush looking towards the head section a limit stop is provided.

6. Bolt with shearable head according to claim 5, wherein the limit stop is a cap-like shoulder, protruding at least partly from the outer circumference of the external thread of the threaded bush.

7. Bolt with shearable head according to claims 1, 5 or 6, wherein the threaded bush also includes a head section and a taper section, arranged in between threaded bush and head section.

8. Bolt with shearable head according to claim 7, wherein they are composed of an inner bolt with shearable head and an outer bolt with shearable head, being in mesh with each other.

9. Bolt with shearable head according to claim 1, wherein there is an inner recess in the head section, in the taper section and in the external thread section.

10. Bolt with shearable head according to claim 9, wherein the end section has a radial outer circumference, and the threaded bush also extends around the radial outer circumference of the end section.

11. Bolt with shearable head according to claim 9, wherein the inner recess is designed as a hexagon socket.

12. Bolt with shearable head according to claim 9 or 11, wherein the cross section of the inner recess in the field of the external thread section is lower than that in the field of the head section.

13. Bolt with shearable head according to claim 9 or 10, wherein in the pre-assembled condition the threaded bush is arranged on the external thread section such that it is fixed or blocked in its turning movement.

14. Bolt with shearable head according to one of the claims 1, 2, 5, 6 or 9 wherein the threaded bush includes a lower limit stop, which may take bearing on the end section, the turning movement being blocked.

15. Bolt with shearable head according to claim 7, wherein the head section of the threaded bush surrounds the head section, connected to the external thread section.

16. Bolt with shearable head according to claim 15, wherein the head section of the threaded bush includes an inner recess, preferably designed as a hexagon socket.

17. Bolt with shearable head according to claim 16, wherein the cross section of the inner recess of the head section of the threaded bush is larger than the cross section of the inner recess of the head section, connected to the external thread section.

18. Bolt with shearable head according to claim 16, wherein the cross section of the inner recess of the head section of the threaded bush is smaller than the cross section of the inner recess of the head section, connected to the external thread section.

19. Bolt with shearable head according to one of the claims 15 to 18, wherein they are composed of an inner bolt with shearable head and an outer bolt with shearable head, being in mesh with each other.

20. Connecting element, in particular screw connector and/or screwed cable lug, with a longitudinal tube-like connection housing, having at least on one of its face sides an opening for receiving a longitudinal element to be connected, in particular an electrical conductor, in the connection housing, having at least one thread opening with a clamping screw in the side wall of the housing wherein the clamping screw is a bolt with shearable head, the bolt with shearable head having an external thread section, a head section and a taper section forming a predetermined breaking point, provided for between the external thread section and the head section, as well as an end section providing a clamping contact wherein a threaded bush is provided, extending at least partly along the external thread section and having in turn an external thread and wherein a cross section of the end section is larger than a cross section of an inner thread of the threaded bush.

* * * * *